United States Patent [19]

Brown et al.

[11] Patent Number: 4,595,599

[45] Date of Patent: Jun. 17, 1986

[54] LUMINESCENT SILANE

[75] Inventors: Roy N. Brown, Edmond, Okla.; Mike F. Stout, Longview, Tex.; Arnulf P. Hagen, Noble; Leo Garwin, Oklahoma City, both of Okla.

[73] Assignee: Advanced Chemical Technologies Company, Oklahoma City, Okla.

[21] Appl. No.: 747,414

[22] Filed: Jun. 21, 1985

[51] Int. Cl.$^4$ .............................................. B05D 5/06
[52] U.S. Cl. ....................................... 427/5; 427/157; 427/137; 252/646; 252/301.16
[58] Field of Search ............... 252/646, 301.16; 427/5, 427/157, 137

[56] References Cited

U.S. PATENT DOCUMENTS

| | | | |
|---|---|---|---|
| Re. 28,531 | 8/1975 | de Vries | 260/22 CB |
| 1,986,591 | 1/1935 | Meyer | 94/1.5 |
| 2,226,404 | 12/1940 | Jenkins | 252/646 |
| 2,252,500 | 8/1941 | Fonda | 250/81 |
| 2,260,461 | 10/1941 | Kolts | 94/1.5 |
| 2,268,538 | 12/1941 | Rodli et al. | 94/1.5 |
| 2,314,699 | 2/1941 | Hale | 252/646 |
| 2,366,754 | 1/1945 | Rodli | 94/1.5 |
| 2,379,741 | 7/1945 | Palmquist | 88/82 |
| 2,440,584 | 4/1948 | Heltzer et al. | 88/82 |
| 2,490,091 | 12/1949 | Reardon | 250/71 |
| 2,952,192 | 9/1969 | Nagin | 94/1.5 |
| 3,011,412 | 12/1961 | Harrington et al. | 94/1.5 |
| 3,030,870 | 4/1962 | Gill, Jr. | 94/1.5 |
| 3,228,900 | 1/1966 | Spellberg et al. | 260/23 |
| 3,253,146 | 5/1966 | de Vries | 250/71 |
| 3,291,011 | 12/1966 | Defregger et al. | 94/1.5 |
| 3,297,617 | 1/1967 | Regenstein et al. | 260/29.6 |
| 3,404,108 | 10/1968 | Regenstein et al. | 260/4 |
| 3,427,273 | 2/1969 | Newing | 427/157 X |
| 3,523,029 | 8/1970 | Searight et al. | 106/237 |
| 3,619,224 | 11/1971 | Inamoto et al. | 106/240 |
| 3,772,065 | 11/1973 | Seiler | 117/123 C |
| 3,819,400 | 6/1974 | Plankl et al. | 117/54 |
| 3,835,087 | 9/1974 | Searight et al. | 260/33.6 R |
| 3,897,378 | 7/1975 | Scohy et al. | 260/22 CB |
| 3,914,468 | 10/1975 | Condon et al. | 427/137 |
| 4,025,476 | 5/1977 | Miller et al. | 260/22 CQ |
| 4,031,048 | 6/1977 | Holmen et al. | 260/22 CQ |
| 4,105,808 | 8/1978 | McKenzie | 427/137 |
| 4,197,227 | 4/1980 | Zeliger | 260/27 R |
| 4,282,281 | 8/1981 | Ethen | 428/149 |
| 4,342,796 | 8/1982 | Brown et al. | 427/136 |

FOREIGN PATENT DOCUMENTS 1453959  9/1966  France.

OTHER PUBLICATIONS

V. Shepard and N. Armstrong, "Electrochemical and Tin Oxide Electrodes", *J. Phys. Phys. Chem.*, vol. 83, No. 10, (1979), pp. 1268–1275.

D. Hawn and N. Armstrong, "Electrochemical Adsorption and Covalent Attachment of Erythrosin to Modified Tin Dioxide Electrodes and Measurement of the Photocurrent Sensitization to Visible Wavelength Light", *J. Phys. Chem.*, vol. 82, No. 11 (1978), pp. 1288–1294.

M. Fujihira, N. Ohishi and T. Osa, "Photocell Using Covalently-Bound Dyes on Semiconductor Surfaces", *Nature*, vol. 268, Jul. 21, 1977, pp. 226–228.

T. Osa and M. Fujihira, "Photocell Using Covalently-Bound Dyes on Semiconductor Surfaces", *Nature*, vol. 264, Nov. 25, 1976, pp. 349–350.

*Primary Examiner*—Shrive P. Beck
*Attorney, Agent, or Firm*—Dunlap, Codding & Peterson

[57] ABSTRACT

A luminescent compound, comprising a phosphor group or groups and an alkylalkoxysilane, and a luminescent composition comprising such luminescent compound and a radioactive substance to provide a source of exciting radiation for the luminescent compound in the composition. The present invention further comprises a method for rendering siliceous surfaces luminescent comprising applying the compound or composition to the surface and reacting the compound or composition with water after the compound or composition has migrated into the surface to hydrolyze the compound or composition. The present invention further comprises a luminescent structure having a siliceous surface incorporating the products of the reaction between the surface, water and the compound or composition of the present invention.

31 Claims, No Drawings

LUMINESCENT SILANE

FIELD OF THE INVENTION

The present invention relates generally to luminescent compounds and compositions, and more particularly to methods of using such compounds and compositions to render a siliceous surface luminescent.

SUMMARY OF THE INVENTION

The present invention comprises a luminescent compound of the formula

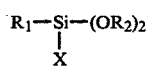

where $R_1$ is a phosphor group; where $R_2$ is an alkyl group containing from 1 to about 8 carbon atoms, a hydroxyalkyl group, or an alkoxyalkyl group; and where X is a phosphor group, $OR_2$, or a second binding site for $R_1$. A luminescent composition is prepared comprising a major amount of the luminescent compound and a radioactive substance capable of providing a source of exciting radiation for the luminescent compound, such radioactive substance being present in an amount effective to irradiate the luminescent compound in the composition.

The present invention further comprises a method for rendering a siliceous surface luminescent comprising applying an effective amount of the luminescent compound or composition to the surface. After the luminescent compound or composition has migrated into the surface, the compound or composition is then reacted with an effective amount of water to hydrolyze the compound or composition.

The present invention further comprises a luminescent structure having a siliceous surface incorporating the products of the reaction between the surface, water and the compound or composition of the present invention.

DETAILED DESCRIPTION OF THE PREFERRED EMBODIMENT

The present invention is directed to luminescent compounds and compositions, to methods for using such compounds and compositions to render siliceous surfaces luminescent, and to luminescent structures formed thereby.

Treatment of surfaces in accordance with the method of the present invention will result in the luminescent compound or composition becoming chemically integrated, or bonded, into the surface. Thus, for an extended period of time, the luminescence imparted to the treated surface will not be impaired substantially, as by the effects of traffic abrasion, wind erosion or atmospheric weathering.

Siliceous surfaces particularly suitable for treatment in accordance with the present invention include concrete, brick, tile and masonry compositions, asphaltic surfaces comprising siliceous aggregate, and organic binder surfaces such as resins comprising fiberglass. It should be noted, however, that the term siliceous surfaces as used herein is not limited to these surfaces, but is intended to include any siliceous surface into which the luminescent compound or composition of the present invention may be incorporated.

The hazards of night driving may be reduced substantially by use of the present invention to apply "glow-in-the-dark" surface markers and traffic stripes to unlighted roadways. Similarly, bridge abutments treated in accordance with the present invention would be visible more readily to night drivers. Further, by means of the present invention, lighted roadways, parking lots, driveways and the like may be illuminated using less wattage.

The present invention also may be utilized to create aesthetic effects in and near buildings or artistic structures having siliceous surfaces. By using luminescent compounds comprising a variety of phosphor groups which will display different colors when irradiated, a variety of dramatic and unique outdoor lighting effects may be designed.

The siliceous surfaces such as those of buildings and artistic structures treated in accordance with the present invention will both reflect and re-radiate incident light. For this reason, such buildings and structures so treated also may be illuminated by conventional lighting means at lower wattages.

The compounds, compositions and methods of the present invention may be used in many ways to improve safety by better lighting, to conserve energy required for conventional lighting, and to create pleasing aesthetic effects. The luminescent effect provided by the present invention may be achieved quickly, safely and inexpensively, and will be relatively permanent.

The luminescent compound of the present invention comprises a silane compound. The silane compounds suitable for use in the practice of the present invention comprise those compounds capable of migrating into a siliceous surface and hydrolyzing therein to form by condensation —Si—O— linkages with the siliceous surface by reacting with the hydroxyl groups thereof. Preferred silane compounds include alkylalkoxy silane varieties, such as dialkoxy- or trialkoxysilanes and their oligomers and limited molecular weight polymers.

The luminescent compound further comprises at least one phosphor group of at least one phosphor. Suitable phosphor groups include those characterized by a cyanine or xanthene dye structure, such as Rhodamine B and Rhodamine F5G. Rhodamine B is a violet or red pigment of the cyanine type having the structure:

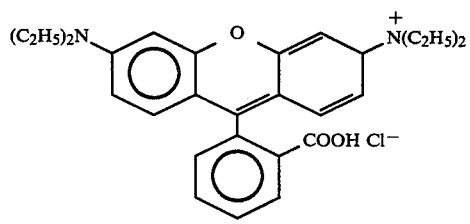

Rhodamine F5G, a red pigment also of the cyanine type, has the structure:

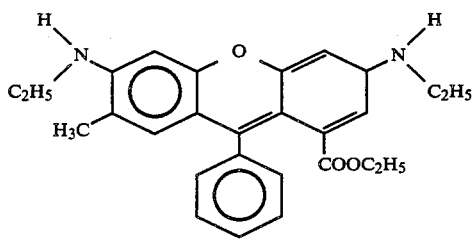

Phosphors characterized by a donor-acceptor structure are also suitable for use in the luminescent compound of the present invention. One such phosphor is Fluorescent Yellow Y, another red pigment, which has the structure:

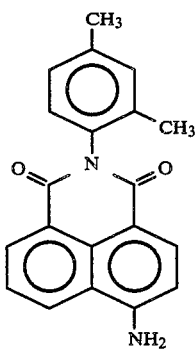

Other phosphors suitable for use in the present invention are those comprising polycyclic aromatic hydrocarbons, or their alkyl or aryl, alkenyl or alkynyl, mono- or bis-substituted derivatives. A typical phosphor of this type is 9,10-bis(phenylethynyl)anthracene which has the structure:

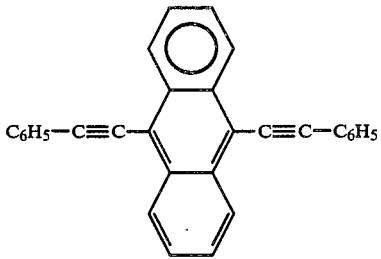

The selected phosphor group is incorporated into the selected silane compound as its alkyl group. The incorporation of the phosphor group may occur before or after the silane is or has been converted to an alkoxysilane as utilized in the luminescent compound of the present invention.

The method by which the phosphor group will be incorporated into the silane may vary according to the silane and phosphor selected. For example, where a phosphor comprising polycyclic aromatic hydrocarbon, or such of its derivatives as are described above, is selected, it may be incorporated into a mono- or dichlorosilane by reaction of the 1- or 2- halogen, or 1,2-dihalogen derivative of the phosphor with molten sodium and the silane to produce the alkyl group ($R_1$) of the silane (or of the luminescent compound, if an alkoxy silane was used in the reaction).

Phosphor groups of any of the above-described phosphors may be incorporated into a tri- or tetrachlorosilane by a Grignard addition. The phosphor's halogen derivative binds to the silane in place of a chlorine atom to produce a di- or trichlorosilane with the phosphor group as its alkyl group.

Phosphor groups having olefinic or acetylinic linkages in their side chains may be incorporated into a silane by combining the phosphor in an anti-Markovnikov fashion with a di- or trichloroalkoxy form of the silane. Thus, there is produced a corresponding saturated adduct, or a mixture of cis and trans isomers of the corresponding ethenyl adduct, respectively.

In the above reaction, the phosphor group may bind to the silane at any hydrogen-substitutable position of the silane to a side chain of the phosphor group. A preferred binding location of the phosphor group (that is, its unsaturated group) is a position on, nearest to, or no more than one location removed from, a benzenoid structure of the phosphor group.

Each molecule of the luminescent compound of the present invention comprises at least one phosphor group. In those compounds in which each molecule comprises only one phosphor group, such phosphor group may be bonded to the silicon atom at one position, or it may be bonded at two positions generally adjacent to one another on the silicon atom. It is believed that this double bonding of a single phosphor group will provide a stronger and more durable luminescent compound than is provided by those luminescent compounds in which each molecule comprises one or two single bonded phosphor groups.

Before or after the phosphor group is incorporated into the silane, the silane is converted to an organosilicon compound, usually a trialkoxysilane or dialkoxysilane, containing the hydrolyzable moiety, as discussed above. Suitable hydrolyzable moieties include alkoxy groups, hydroxyalkoxy groups, and alkoxyalkoxy groups, the alkyl groups of which may contain from 1 to about 8 carbon atoms, as described at column 4, line 50 to column 5, line 34 of U.S. Pat. No. 4,342,796, issued on Aug. 3, 1982 to Brown, et al., and assigned to assignee of the present invention.

Based on the above, the luminescent compound of the present invention may be represented by the monomeric formula:

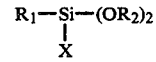

In this formula, $R_1$ is a phosphor group. $R_2$ is an alkyl group containing from 1 to about 8 carbon atoms, a hydroxyalkyl group, or an alkoxyalkyl group, so that $OR_2$ represents the hydrolyzable moiety, described above. X may be a phosphor group, $OR_2$, or a second binding site for $R_1$.

Thus, where the selected silane is a trichlorosilane or trialkoxysilane, X will be $OR_2$, and each molecule of the luminescent compound will comprise one phosphor group bonded at a single position on the silicon atom. Where a dichlorosilane or dialkoxysilane is selected, X may be either a second phosphor group of the same or a different phosphor as $R_1$, or X may be a second adjacent binding site on the single phosphor group.

Under normal atmospheric conditions, the luminescent compound of the present invention may exist in a liquid or a solid state depending primarily on the size of the phosphor (or phosphors) utilized. Where smaller phosphors are utilized, the luminescent compound more likely will exist in a liquid state so that a substantially pure preparation of the luminescent compound can be applied directly to the siliceous surface to be rendered luminescent. Where larger phosphors are utilized, the luminescent compound more likely will be in a solid or semi-solid state. In such instances, it is preferable to mix the compound in a liquid carrier for application purposes. More preferably, the liquid carrier will be a solvent for the luminescent compound, so that when the compound is applied to the surface to be treated, the compound will be dispersed substantially uniformly over the surface. Further, dissolution of the luminescent compound in a solvent may assist in the migration of the compound into the structure. For this reason, it is also often preferable to dissolve a pure liquid luminescent compound in a liquid carrier.

Preferably, the liquid carrier is anhydrous and inert both to the luminescent compound and to the surface to be treated. More preferably, the liquid carrier comprises a volatile organic solvent with an evaporation rate sufficiently low to permit the luminescent compound to migrate substantially uniformly over the surface of the structure to be treated, while functioning as a carrier to assist in the migration of the luminescent compound into the surface. Examples of such solvents include aromatic, naphthenic and aliphatic organic solvents, such as toluene, xylene, high boiling naphthas, cyclohexane, tetra-, hydro-, and decahydronaphthalenes; ketones, such as acetone and methylisobutyl ketone; and alcohols, such as ethanol, propanol and butanol.

The amount of liquid carrier and luminescent compound used to treat the surface can vary widely, provided sufficient luminescent compound is present in the carrier to substantially cover the surface. Preferably, the mixture (or solution) of carrier and compound comprises from about 0.1 to about 50 weight percent of luminescent compound.

In accordance with the method of the present invention, the luminescent compound, either in a substantially pure preparation or carried in a liquid, is used to render a siliceous surface luminescent. The application of the luminescent compound preferably is carried out as described at column 6, line 61 to column 8, line 2, of U.S. Pat. No. 4,342,796.

An effective amount of the luminescent compound is applied to the surface to be rendered luminescent. After the luminescent compound has migrated into the surface, the luminescent compound is reacted with an effective amount of water to hydrolyze the luminescent compound. The resulting hydrolytic product then binds chemically through condensation, with molecules of siliceous compounds within the treated surface. The water may be applied manually to the treated surface by spraying or the like. However, it is to be understood that alternatively the water-reacting step of the present invention may occur as a result of a natural rainfall or in some instances as a result of a heavy dew.

It should be noted that siliceous surfaces which appear to be substantially dry contain some internal moisture comprising residual and free moisture. This internal moisture content will vary according to various atmospheric and environmental factors, such as time since last rainfall, and prevailing air dewpoint, humidity and temperature. Thus, in some instances there may be a sufficient amount of internal moisture present within the surface being treated to accomplish the water-reacting step of the method of the present invention. However, it is believed that a very dry surface, such as a concrete surface having a residual moisture content of about 5 weight percent or less, would not contain sufficient free moisture to hydrolyze the luminescent compound. In such instances, an external source of water is required to effect hydrolysis and binding of the luminescent compound to the surface.

The luminescent compound, prepared and applied as described above, will emit light by reflection and reradiation when exposed to a source of exciting radiation. Thus, a siliceous surface which has been treated with the luminescent compound of the present invention will emit light when exposed to light, such as the headlights of automobiles. However, the treated surface will not emit light in the absence of such a source of exciting radiation.

Where it is desirable for a siliceous surface to emit light even in total darkness, the surface may be treated with the luminescent composition of the present invention. This composition comprises a major amount of a luminescent compound, as described above, and a radioactive substance capable of providing a source of exciting radiation for the luminescent compound, such radioactive substance being present in an amount effective to irradiate the luminescent compound in the composition.

Preferably, the radioactive substance will have a relatively long half-life, so that the phosphor group will continue to receive exciting radiation for an extended period of time. Suitable radioactive substances with relatively long half-lives include compounds of radium and thorium. Salts of radioactive metals, such as radioactive metal siliconates, are preferred radioactive substances.

The luminescent composition further may comprise a liquid carrier, which preferably comprises a solvent in which both the luminescent compound and the radioactive substance are dissolved. More preferably, the solvent is one of the solvents described above with respect to the luminescent compound.

The luminescent composition is applied to the siliceous surface in the manner described above for the application of the luminescent compound and in accordance with the procedure set out in U.S. Pat. No. 4,342,796. A surface thus treated, having an internal source of exciting radiation by virtue of the radioactive substance, will emit light even in total darkness. That is, even in the absence of any external incident of light such as from automobile headlights, flood lights, flashlights, street lights, or the like, the treated surfaces, such as roadways, bridge abutments, or building walls, will be visible at night.

It is to be noted that the beneficial effects of treating siliceous surfaces in accordance with the present invention are not limited to rendering such surfaces luminescent. In addition to the luminescence, such treated surfaces will have improved resistance to water and salt intrusion, and the deleterious effects caused thereby, as are disclosed in U.S. Pat. No. 4,342,796.

Changes may be made in the nature, composition, operation and arrangement of the various elements, steps and procedures described herein without departing from the spirit and scope of the invention as defined in the following claims.

What is claimed is:

1. A method for rendering a siliceous surface luminescent comprising:

applying to the surface an effective amount of a luminescent compound having the formula:

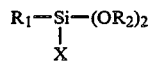

where $R_1$ is a phosphor group; where $R_2$ is an alkyl group containing from 1 to about 8 carbon atoms, a hydroxyalkyl group, or an alkoxyalkyl group; and where X is a phosphor group, $OR_2$, or a second binding site for $R_1$; and reacting the luminescent compound with an effective amount of water to hydrolyze the luminescent compound after the luminescent compound has migrated into the surface.

2. The method of claim 1 in which the luminescent compound is carried in a liquid.

3. The method of claim 2 in which the liquid is a solvent.

4. The method of claim 1 in which the phosphor group is characterized by a cyanine or xanthene dye structure.

5. The method of claim 4 in which the phosphor group is Rhodamine B.

6. The method of claim 4 in which the phosphor group is Rhodamine F5G.

7. The method of claim 1 in which the phosphor group is characterized by a donor-acceptor structure.

8. The method of claim 7 in which the phosphor group is Fluorescent Yellow Y.

9. The method of claim 1 in which the phosphor group is characterized by a polycyclic aromatic hydrocarbon.

10. The method of claim 9 in which the polycyclic aromatic hydrocarbon is an alkyl or aryl, alkenyl or alkynyl, mono- or bis-substituted derivative.

11. The method of claim 10 in which the polycyclic aromatic hydrocarbon is a 9,10-bis(phenylethynyl)anthracene.

12. The method of claim 1 in which the surface to which the luminescent compound is applied is substantially dry.

13. The method of claim 1 in which X is a phosphor group of the same phosphor as is $R_1$.

14. The method of claim 1 which X is a phosphor group of a different phosphor than is $R_1$.

15. A method for rendering a siliceous surface luminescent comprising:

contacting the surface with an effective amount of a luminescent composition comprising a luminescent compound having the formula:

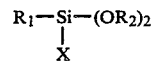

where $R_1$ is a phosphor group; where $R_2$ is an alkyl group containing from 1 to about 8 carbon atoms, a hydroxyalkyl group, or an alkoxyalkyl group, and where X is a phosphor group, $OR_2$, or a second binding site for $R_1$; and a radioactive substance capable of providing a source of exciting radiation for the luminescent compound, such radioactive substance being present in an amount effective to irradiate the luminescent compound in the composition; and reacting the luminescent composition with an effective amount of water to hydrolyze the luminescent compound after the luminescent composition has migrated into the surface.

16. The method of claim 15 in which the luminescent composition further comprises a liquid carrier.

17. The method of claim 16 in which the luminescent compound and the radioactive substance are dissolved in the liquid carrier.

18. The method of claim 15 in which the phosphor group is characterized by a cyanine or xanthene structure.

19. The method of claim 18 in which the phosphor group is Rhodamine B.

20. The method of claim 18 in which the phosphor group is Rhodamine F5G.

21. The method of claim 15 in which the phosphor group is characterized by a donor-acceptor structure.

22. The method of claim 21 in which the phosphor group is Fluorescent Yellow Y.

23. The method of claim 15 in which the phosphor group is characterized by a polycyclic aromatic hydrocarbon.

24. The method of claim 22 in which the polycyclic aromatic hydrocarbon is an alkyl or aryl, alkenyl or alkynyl, mono- or bis-substituted derivative.

25. The method of claim 24 in which the polycyclic aromatic hydrocarbon is a 9,10-bis(phenylethynyl)anthracene.

26. The method of claim 15 in which the radioactive substance comprises a radioactive metal salt.

27. The method of claim 15 in which the radioactive substance comprises a radioactive metal siliconate.

28. The method of claim 15 in which the radioactive substance comprises radium.

29. The method of claim 15 in which the radioactive substance comprises thorium.

30. The method of claim 15 in which X is a phosphor group of the same phosphor as is $R_1$.

31. The method of claim 15 in which X is a phosphor group of a different phosphor than is $R_1$.

* * * * *